United States Patent Office 3,755,497
Patented Aug. 28, 1973

3,755,497
ANTISTATIC POLYESTER FIBER CONTAINING POLYETHER
Gene C. Weedon, Richmond, and Lamberto Crescentini, Chester, Va., assignors to Allied Chemical Corporation, New York, N.Y.
No Drawing. Original application Apr. 30, 1970, Ser. No. 33,530. Divided and this application Sept. 15, 1971, Ser. No. 180,907
Int. Cl. C08g $39/10$
U.S. Cl. 260—860
5 Claims

ABSTRACT OF THE DISCLOSURE

It has been found that an antistatic fiber of polyamide, polyester, polyurea, polyurethane or polysulfonamide can be prepared by uniformly dispersing between about 1 percent and about 12 percent by weight of a compound represented by the formula:

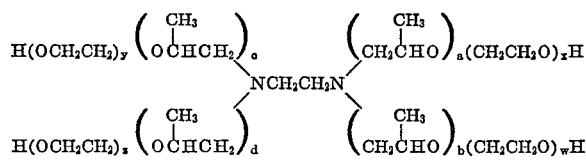

where $a$, $b$, $c$, $d$, $w$, $x$, $y$, and $z$ are each a whole number and the total of $a$, $b$, $c$, and $d$ is between 8 and 850 and the total of $w$, $x$, $y$, and $z$ is between 8 and 1,000. The compound has a molecular weight between about 4,000 and 135,000 and the ethylene oxide moiety makes up 10 to 90% of the molecular weight of the compound.

---

This is a division of application Ser. No. 33,530, filed Apr. 30, 1970, now U.S. Pat. No. 3,657,386.

BACKGROUND OF THE INVENTION

It is known in U.S. Pat. No. 3,329,557 to Magat and Tanner to use poly(alkylene ether) of high molecular weight to improve static resistant properties of synthetic filaments. More specifically, it is disclosed in U.S. Pat. No. 3,475,898 to Magat and Sharkey to use poly(ethylenepropylene) ether glycols for the same purpose. This same patent discloses that residues of coupling compounds such as diamines may be present within the polymer chain. However, not all amines coupled with a compound type taught by the Magat and Sharkey patent give a truly antistatic fiber. For example, compare Examples 1 to 6 and 12 to 19 with Examples 7 to 11.

SUMMARY OF THE INVENTION

Applicants have discovered that the propylene oxide-ethylene oxide copolymers based on ethylene diamine, as represented by the following formula,

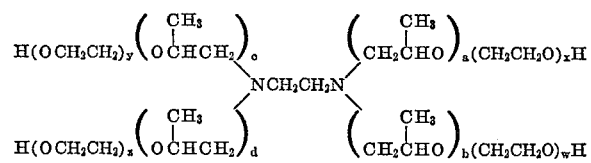

when used in fibers of polyamide, polyester, polyurea polyurethane or polysulfonamide, uniformly dispersed so that the fibers contain between about 1% and about 12%, preferably between about 2% and about 8% by weight, must, in order to achieve true antistatic properties have the chemical structure of the above formula where $a$, $b$, $c$, $d$, $w$, $x$, $y$, and $z$ are each a whole number, the total of $a$, $b$, $c$, and $d$ is between 8 and 850, the total of $w$, $x$, $y$, and $z$ is between 8 and 1,000, the ethylene oxide moiety must make up 10 to 90% of the molecular weight of the compound, preferably about 20% to about 80%, and the compound must have a molecular weight between about 4,000 and 135,000, preferably between about 4,000 and about 50,000, in order to be a truly antistatic fiber. The criticality of the various parameters is shown in the following examples.

Example 1

A glass reactor equipped with a heater and stirrer was charged with a mixture of 152 grams of e-caprolactam and 80 grams of aminocaproic acid. The mixture was then flushed with nitrogen and was stirred and heated to 255° C. over a one hour period at atmospheric pressure to produce a polymerization reaction. The heating and stirring was continued at atmospheric pressure under a nitrogen sweep for an additional four hours in order to complete the polymerization. During the last thirty minutes of the polymerization, 48 grams of an antistatic agent (Tetronic 1508, Wyandotte) having the formula:

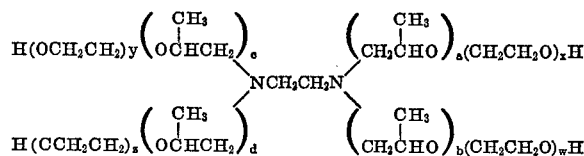

a molecular weight of 27,000 and the ethylene oxide moiety making up 80% of the molecular weight, was added to the polycaproamide and stirring was continued to thoroughly mix the antistatic agent throughout the polymer. Nitrogen was then admitted to the glass reactor and a small pressure was maintained while the polymer was extruded from the glass reactor in the form of a polymer ribbon. The polymer ribbon was subsequently cooled, pelletized using a Wiley Mill, washed and then dried. The polymer was a white solid having a relative viscosity of about 55 to 60, as determined at a concentration of 11 grams of polymer in 100 ml. of 90 percent formic acid at 25° C. (ASTMD–789–62T).

The polycaproamide pellets containing the antistatic agent were melted at about 285° C. and then melt extruded under a pressure of 1500 p.s.i.g. through a 16-orifice spinnerette, each of the orifices having a diameter of 0.014 inch, to produce a 250 denier fiber. The fiber was collected at about 1,000 feet per minute and was drawn about 3.5 times its extruded length to produce a 70 denier yarn. A control yarn containing no antistatic agent was produced in the same manner as described above.

Example 2

The 70 denier polycaproamide yarn containing an antistatic agent and the control yarn which was produced in Example 1 were woven into conventional plain weave fabrics. The yarns contained ½Z twist.

The fabrics were cut into fabric test samples having a width of 3 inches and a length of 9 inches. The fabric samples were tested for their antistatic property in accordance with the general procedure described in the Technical Manual of the American Association of Textile Chemists and Colorists, 1969 edition, volume 45 at pages 206 and 207. This test procedure is entitled "Electrostatic Clinging of Fabrics: Fabric-to-Metal Test" and is numbered A.A.T.C.C. 115–1969.

The time for each fabric sample to decling completely of its own accord was recorded. Fresh test and rubbing fabrics were used for each determination and the fabric samples were tested in triplicate in both warp and filling directions with nylon and polyester rubbing fabrics. The averages of the test data collected are contained in Table I below.

The fabric samples were subjected to repeated washings to evaluate the permanency of the antistatic property imparted by the antistatic agent. The fabrics were washed in a commercial washing machine having conventional washing and rinsing cycles at a temperature of about 70° C. using a conventional laundry detergent. The fabrics were then dried in a commercial dryer at a temperature of about 80° C. for a period of time of about 30 minutes. Prior to testing, the fabric samples were pressed free of creases with a clean, dry iron at the appropriate settings and were then conditioned from the dry side at 20 percent relative humidity and a temperature of 24° C. for at least 24 hours (Technical Manual of the A.A.T.C.C., page 206, paragraph 4.3, note 9.5).

The average times for each respective set of fabric samples to decling completely of their own accord after 0, 5, 10 and 25 wash cycles are contained in Table I below. The antistatic measurements were made at 20 percent relative humidity and a temperature of 24° C. as in the A.A.T.C.C. procedure.

TABLE I.—ELECTROSTATIC CLINGING OF FABRICS
[Fabric-to-Metal Test Results]

| Antistatic agent in fabric | Average times for fabric samples to decling from metal completely on their own accord, seconds | | | |
|---|---|---|---|---|
| | Un-washed | 5 wash cycles | 10 wash Cycles | 25 wash Cycles |
| None | 0 | >300 | >300 | >300 |
| Structure of Example 1 | 72 | 200 | | 127 |

The textile industry at present accepts a cling time of 300 seconds or less as passing, indicating significant antistatic properties, thus the control was not acceptable while the additive of this example was effective in rendering the yarn antistatic.

Example 3

Procedures of Examples 1 and 2 were repeated with an antistatic agent having the same structure as given in Example 1 with a molecular weight of 34,000 to 35,000 and an ethylene oxide moiety content of 70% of the molecular weight. The cling time for fabric as described in Example 2 was 156 seconds after 25 washes illustrating the effectiveness of the antistatic additive.

Example 4

The procedures of Examples 1 and 2 were repeated using an antistatic agent (Tetronic 1307, Wyandotte) having the structure as shown in Example 1 with a molecular weight of 18,600 and an ethylene oxide moiety content of 70% of the molecular weight of the compound. The cling time for a fabric as described in Example 2 was 63 seconds after 20 washes, illustrating the effectiveness of the additive in reducing static charge.

Example 5

The procedures of Examples 1 and 2 were repeated using an antistatic agent (Tetronic 1504, Wyandotte) having a structure shown in Example 1 with the molecular weight of 12,500 and a 40% ethylene oxide moiety molecular weight content. The cling time for a fabric as described in Example 2 was 48 seconds after 20 washes showing the effectiveness of the additve in reducing static. The lower range of ethylene oxide content in this compound still provides effective antistatic protection.

Example 6

The procedures of Examples 1 and 2 were repeated using an antistatic agent (Tetronic 1302, Wyandotte) having the structure of Example 1 with a molecular weight of 7800 and an ethylene oxide moiety content of 20% of the molecular weight of the compound. The cling time as described in Example 2 was 128 seconds at 30% relative humidity after 20 washes, illustrating the effectiveness of this additive at an even lower level of ethylene oxide content.

Example 7

The procedures of Examples 1 and 2 were repeated using an additive (Tetronic 504, Wyandotte) of the structure given in Example 1 with a molecular weight of only 3400 and an ethylene oxide content of 40%. The cling time for the fabric as described in Example 2 was over 300 seconds after 5 and 10 washes, illustrating that low molecular weight compounds of the structure given in Example 1 are not suitable as durable antistatic agents.

Example 8

Procedures of Examples 1 and 2 were repeated using an antistatic agent (Pluronic 108, Wyandotte) having the formula HO(CH$_2$CH$_2$O)$_x$(—H$_2$C—CHO)$_y$—(CH$_2$CH$_2$O)$_z$H 

molecular weight 15,500 and 80% ethylene oxide moiety, i.e., sum of $x$ and $z$ is 80% of the molecule.

The cling time for fabric as described in Example 2 was more than 600 seconds after 10 launderings illustrating the advantage of a more highly branched nitrogen coupled compound such as shown in Example 1.

Example 9

The procedures of Examples 1 and 2 were repeated using additive (Polyox WSR 301, Union Carbide) having the structure HO(CH$_2$CH$_2$O)$_x$H and a molecular weight of 4 million. This compound is described in the prior art as an antistatic agent. The cling time for fabric as described in Example 2 was more than 600 seconds after 5 washes, illustrating that although a high molecular weight polyethylene oxide was used, it is not an effective antistatic agent as defined by the cling test. This result is significant since resistivity measurements have often been cited as indicating the reduced static propensity of such compounds. In actual practice, however, no substantial improvements in antistatic performance is noted. It has been found that there is no correlation between surface resistivity measurements and cling test results.

Example 10

The procedures of Examples 1 and 2 were repeated using an additive (Carbowax 20M, Union Carbide) prepared as described in British Pat. 793,915 and having a molecular weight of about 20,000. This compound is described as an antistatic agent in the prior art.

The cling time for fabric as described in Example 2 was over 600 seconds after 5 washes, illustrating that a high molecular weight polyethylene glycol is a nondurable antistatic agent as measured by the cling technique. Also the polypropylene oxide moiety (absent here) of the additive agent molecule combined with the branched nitrogen (absent here) coupling is considered necessary as shown in Examples 1 to 6.

Example 11

The procedures of Examples 1 and 2 are repeated using an additive of the structure N(CH$_2$CH$_2$O(C$_3$H$_6$O)$_x$(C$_2$H$_4$O)$_y$H)$_3$ 

(ethanolamine basic molecule) of molecular weight 13,500 and 21% ethylene oxide moiety. The cling time for a fabric as described in Example 2 was 15 seconds after 10 washes but above 300 seconds after 25 washes. This illustrates that a branched tertiary nitrogen structure was beneficial in reducing static. However, it was not permanent and failed on continued washings.

Example 12

This example illustrates addition of antistatic agent by injection into molten poly-epsilon-caprolactam prior to spinning. A conventional coil melter was used to melt the nylon 6 polymer which had a relative formic acid viscosity of 49. The antistatic agent as described in Example 4 was injected at 90 to 100° C. into the molten stream prior to the main pump at a constant rate so that 4% of the additive was present in the final fiber. The final spinning temperature of 270° C. was used. The spinnerette pack consisted of layers of four different mesh sizes of sand. The spinnerette contained 12 holes, 0.25 mm. in diameter. Filaments were spun and drawn in a conventional way using a 3.33 draw ratio to give 40 denier 12 filament apparel yarn. The yarns were woven and tested as described in Example 2. The cling time was 153 seconds after 25 washings, illustrating effective antistatic control when the additive was incorporated by injection. A control yarn similarly prepared and woven had a cling time of more than 600 seconds. A yarn containing 3% additive of Example 10 was woven into a fabric and also had a cling time of more than 600 seconds.

Example 13

The procedure was used as described in Example 12 except that the injection rate was varied to give 2, 3, 4 or 6% of the antistatic agent in the final yarns. The cling time was determined on woven fabrics as described in Example 2 as follows:

| Percent antistatic agent: | Cling time, sec. at 30% RH |
| --- | --- |
| 2 | 259 |
| 3 | 153 |
| 4 | 66 |
| 6 | 18 |

Example 14

This example describes addition of antistatic additives into an extruder.

The antistatic agent, such as the one described in Example 1, was melted and injected into an extruder and blended with molten nylon 6 polymer to give about 4% of the additive spun through spinnerettes as described in Example 12.

The filaments were spun and drawn and woven into fabrics and tested by the cling test. The cling time @ 30% RH was 138 seconds with 3%, and 58 seconds with 4% additive after 25 washes. Similar fabrics without additive control or with 3% Carbowax 20M had a cling time of more than 600 seconds.

PREFERRED EMBODIMENTS FOR CARPET YARN

Example 15

The procedure of Example 1 was followed using an antistatic agent (Tetronic 901, Wyandotte) of the structure of Example 1 with a molecular weight of 4,750 and ethylene oxide moiety content of 10% of the molecule. Polycaproamide pellets containing the antistatic agent were melted at about 285° C. and then melt extruded under pressure of 15 p.s.i.g. to a 70 orifice spinnerette, each of the orifices having a diameter of 0.018 inch to produce a 4500 denier fiber. The fiber was collected at 1000 feet per minute and was drawn about 4 times the extruded length to produce 1125 denier yarn. A control yarn containing no antistatic agent was prepared in the same manner as described above.

The yarns were textured using a steam jet and then two-plied. The yarns were tufted into a level loop carpet at 6.5 stitch rate, 9–10/32 inch pile height, mock dyed and latexed. Static buildup of the carpet was tested by measuring the electrostatic voltage build-up on a person walking with a series of short shuffling steps on a piece of carpet. This test is an adaptation of the C.R.I Stroll Test, for use as a screening method for smaller carpet samples. The carpet was conditioned at 70° F. at 20% relative humidity. The voltage generated was 2.9 k.v. while a control carpet generated 10 kv.

Example 16

The procedure of Example 15, using the same antistatic agent as used in Example 4, was repeated. The voltage generated was 5.1 kv., a significant reduction over Control carpet, 10 kv.

Example 17

The procedure of Example 15 was repeated, using the same antistatic agent that was used in Example 1, with a resulting voltage generated in the shuffle test of 5.2 kv. as compared with Control of 10 kv.

Example 18

The procedure of Example 15 was repeated, using an antistatic agent (Tetronic 702, Wyandotte) with the structure of Example 1, molecular weight of 4000 and an ethylene oxide moiety content of 20%. The voltage generated in the shuffle test was 4.1 kv. compared with the 10 kv. Control.

PREFERRED EMBODIMENT FOR POLYESTER

Example 19

Polyethylene terephthalate was prepared by addition of 465 parts of ethylene glycol and 830 parts of terephthalic acid to a 1 gallon autoclave. The autoclave was closed and purged 3 times with nitrogen, pressured to 75 p.s.i.g. with nitrogen and heated to 263° C. for 4 hours. Distillate was removed periodically while pressure was maintained at 75 p.s.i.g. by venting. Polymerization was continued for 4 hours under full vacuum, about 0.7 mm. Hg, at 275–283° C. One hour prior to extrusion 48 parts of the same antistatic agent as described in Example 1 was added and blended with the polymer. The batch was extruded at about 5 p.s.i., and later chipped and dried. Polymer was spun using conventional equipment to give a 70 denier, 16 filament yarn after drawing, woven and tested as described in Example 2. Control fabric with no additive had a cling time, at 30% relative humidity, of more than 300 seconds after 25 washings, while the sample from this example containing 4% antistatic additive had a cling time of 125 seconds.

DISCUSSION

By "antistatic" is meant fibers that will pass the cling test and the shuffle test, at a voltage level less than 7 kv., as described in the above examples. By "fiber" is meant multifilament yarn, monofilament, staple, and all the known physical forms of synthetic fibers. By "polyamide" is meant the polymers made by condensation of diamines with dibasic acids or by polymerization of lactams or amino acids, resulting in a synthetic resin characterized by the recurring amide group —CONH—. By "polyester" is meant the synthetic resins produced by the reaction of a basic acid with dihydric alcohols, aryl and aliphatic oxides; aryl carboxy-hydroxy alcohols or the trifunctional monomer such as glycerol or citric acid. By "ethylene oxide moiety" is meant the portion of the chemical molecule —($CH_2CH_2O$)—. By "molecular weight" is meant the conventional number average molecular weight. By "uniformly dispersed" is meant dispersion adequate to provide antistatic properties to the fiber. Mixing by the methods of the above examples is sufficient.

Sleeves were dyed using fibers which were prepared with antistatic additives of this invention and tested for dyeability characteristics. There was no significant loss or gain of dyeability properties in the tests.

Thus, it is apparent from the above examples, that in order to obtain an antistatic fiber which will retain its antistatic properties after repeated laundering, it is necessary to use the compound of applicants' invention. Related compounds do not give a permanent antistatic fiber. Thus, the chemical structure, molecular weight, and ethylene oxide moiety content as defined in the following claims are critical to the applicants' invention.

A further evidence of the superiority of additives of this type over the previously known art is that there has been found no restriction on additive particulate size with respect to ease of removal by water. For example, in the examples previously cited wherein the additive is dispersed within molten polycaproamide and then subjected to a leaching step to remove monomer, it has been found that additives of the subject type are not removed by hot water during the leaching cycle whereas similar compounds of unmodified polyethylene oxide are essentially removed. This observation is illustration in the following table:

TABLE A

| Additive | Percent added | Percent found in ⅛ inch³ pellets [a] | Technique |
|---|---|---|---|
| From Example 4 (Tetronic 1307) | 5 | 4.2 | Gravimetric. |
| From Example 1 (Tetronic 1508) | 5 | 3.8 | Do. |
| From Example 15 (Tetronic 901) | 5 | 4.9 | Metal tracer. |
| From Example 10 | 5 | 0.5 | Gravimetric. |

[a] After 4 1-hr. wash cycles at 100° C.

The particle size of the additives was quite large due to the relatively low shear developed in the agitated kettle. Microscopic examination of pellets of the washed samples showed the particle size diameters ranged from 100 microns up to 5000 microns with the estimated means particle size about 700 microns. The polyethylene oxide copolymer formed voids of these approximate dimensions. Some elongation of the additive particles occurs during extrusion of the molten polyamide during pelletizing; therefore, the length of the additive particles was about 3 times that of the diameter.

We claim:

1. An antistatic polyester fiber containing between about 1 percent and about 12 percent by weight of a compound represented by the formula:

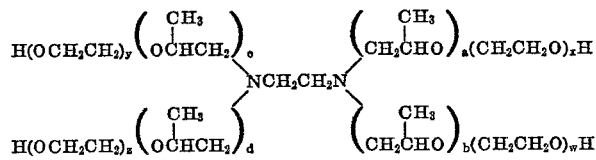

where $a$, $b$, $c$, $d$, $w$, $x$, $y$, and $z$ are each a whole number, the total of $a$, $b$, $c$ and $d$ is between 8 and 850 and the total of $w$, $x$, $y$, and $z$ is between 8 and 1,000; said compound is substantially uniformly dispersed in said fiber, said compound has a molecular weight between about 4,000 and about 135,000 and said ethylene oxide moieties make up 10% to 90% of the molecular weight of said compound.

2. The polyester fiber of claim 1 wherein the molecular weight is about 27,000, the ethylene oxide moieties make up about 80% of the molecular weight of the compound, and said fiber contains from about 2% to about 8% of said compound.

3. In a method of preparing an antistatic polyester fiber comprising uniformly dispersing an antistatic additive in a fiber-forming polymer, and then forming the fiber by conventional methods, the improvement consisting of using for the antistatic additive, about 1–12%, by weight of a compound represented by the formula

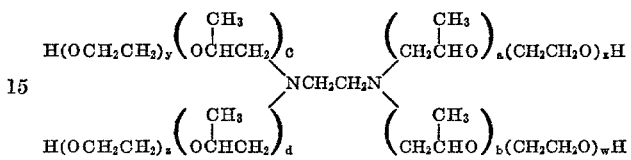

where $a$, $b$, $c$, $d$, $w$, $x$, $y$, and $z$ are each a whole number, the total of $a$, $b$, $c$, and $d$ is between 8 and 850 and the total of $w$, $x$, $y$, and $z$ is between 8 and 1,000; said compound has a molecular weight between about 4,000 and about 135,000 and said ethylene oxide moieties make up 10% to 90% of the molecular weight of said compound.

4. The method of claim 3 wherein molecular weight is between about 4,000 and about 50,000, said ethylene oxide moieties make up about 20% to about 80% of the molecular weight of said compound, said fiber contains from about 2% to about 8% of said compound.

5. The method of claim 4 wherein the additive is injected into the polymer just prior to formation of fiber in an amount from about 4 to about 8% by weight of the fiber.

References Cited
UNITED STATES PATENTS

| | | | |
|---|---|---|---|
| 2,922,773 | 1/1960 | Coler et al. | 260—32.6 |
| 3,297,652 | 1/1967 | Tomiyama et al. | 260—75 |
| 3,597,146 | 3/1971 | Tesoro | 8—115.7 |
| 3,657,386 | 4/1972 | Weedon et al. | 260—857 PE |

WILLIAM H. SHORT, Primary Examiner

E. WOODBERRY, Assistant Examiner

U.S. Cl. X.R.

8—168, Dig. 4; 260—75 T N, Dig. 15, 17, 21, 28